United States Patent
Zaizen et al.

(10) Patent No.: US 12,448,662 B2
(45) Date of Patent: Oct. 21, 2025

(54) NON-ORIENTED ELECTRICAL STEEL SHEET AND METHOD FOR PRODUCING SAME

(71) Applicant: JFE Steel Corporation, Tokyo (JP)

(72) Inventors: Yoshiaki Zaizen, Tokyo (JP); Yoshihiko Oda, Tokyo (JP); Tomoyuki Okubo, Tokyo (JP); Takaaki Tanaka, Tokyo (JP); Yukino Miyamoto, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 860 days.

(21) Appl. No.: 17/413,752

(22) PCT Filed: Aug. 27, 2019

(86) PCT No.: PCT/JP2019/033418
§ 371 (c)(1),
(2) Date: Jun. 14, 2021

(87) PCT Pub. No.: WO2020/136993
PCT Pub. Date: Jul. 2, 2020

(65) Prior Publication Data
US 2022/0056548 A1  Feb. 24, 2022

(30) Foreign Application Priority Data
Dec. 27, 2018 (JP) .................... 2018-245507

(51) Int. Cl.
*C21D 9/46* (2006.01)
*C21D 1/74* (2006.01)
(Continued)

(52) U.S. Cl.
CPC .............. *C21D 9/46* (2013.01); *C21D 1/74* (2013.01); *C21D 6/005* (2013.01); *C21D 6/008* (2013.01);
(Continued)

(58) Field of Classification Search
CPC ... C21D 9/46; H01F 1/14716; H01F 1/14775; H01F 1/16; H01F 1/18
See application file for complete search history.

(56) References Cited

U.S. PATENT DOCUMENTS 5,009,726 A * 4/1991 Nishimoto ........... C21D 8/1222
  148/112
5,169,579 A * 12/1992 Marcus ................. B33Y 10/00
  219/121.85
(Continued)

FOREIGN PATENT DOCUMENTS

CN  1803389 A  7/2006
CN  103834858 A * 6/2014
(Continued)

OTHER PUBLICATIONS

Extended European Search Report for European Application No. 19906231.6, dated Mar. 9, 2022, 14 pages.
(Continued)

*Primary Examiner* — Sally A Merkling
*Assistant Examiner* — Austin Pollock
(74) *Attorney, Agent, or Firm* — Buchanan Ingersoll & Rooney PC (57) ABSTRACT

A non-oriented electrical steel sheet having a high magnetic flux density and a low iron loss at a high frequency is produced by subjecting a slab containing, in mass %, C: not more than 0.0050%, Si: 2.8 to 6.5%, Mn: 0.05 to 2.0%, P: not more than 0.10%, S: not more than 0.0050%, Al: 0.3 to 2.0%, N: not more than 0.0050% and Zn: 0.0005 to 0.0050% to a hot rolling, a hot-band annealing, a cold rolling and a finish annealing, a dew point in the hot-band annealing is set to 0 to 70° C. and an atmosphere of the finish annealing has a nitrogen content of not more than 30 vol % and a dew point of not higher than −20° C., and a ratio of the amount of nitrogen present as AlN in an entire sheet thickness to the
(Continued)

amount of nitrogen present as AlN in a layer from one-side surface of steel sheet to a depth of 1/20 of sheet thickness is made to not less than 5.0.

8 Claims, 2 Drawing Sheets

(51) Int. Cl.
    *C21D 6/00*         (2006.01)
    *C21D 8/12*         (2006.01)
    *C22C 38/00*       (2006.01)
    *C22C 38/02*       (2006.01)
    *C22C 38/04*       (2006.01)
    *C22C 38/06*       (2006.01)
    *C22C 38/12*       (2006.01)
    *C22C 38/14*       (2006.01)
    *C22C 38/60*       (2006.01)
    *H01F 1/147*      (2006.01)
(52) U.S. Cl.
    CPC ......... *C21D 8/1222* (2013.01); *C21D 8/1233* (2013.01); *C21D 8/1266* (2013.01); *C21D 8/1272* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/60* (2013.01); *H01F 1/147* (2013.01); *C21D 2241/00* (2013.01); *C22C 2202/02* (2013.01)

(56) References Cited

U.S. PATENT DOCUMENTS

| | | | | |
|---|---|---|---|---|
| 11,279,985 | B2* | 3/2022 | Natori | .................. C22C 38/14 |
| 2013/0263981 | A1 | 10/2013 | Zaizen et al. | |
| 2015/0348686 | A1* | 12/2015 | Toda | ...................... C21D 9/46 |
| | | | | 148/309 |
| 2016/0322137 | A1* | 11/2016 | Lee | ..................... C21D 8/1261 |
| 2019/0228891 | A1 | 7/2019 | Natori et al. | |
| 2019/0345576 | A1* | 11/2019 | Park | ..................... C22C 38/02 |
| 2019/0382867 | A1 | 12/2019 | Zaizen et al. | |
| 2020/0010918 | A1 | 1/2020 | Zaizen et al. | |
| 2020/0095659 | A1* | 3/2020 | Kim | ....................... C21D 9/46 |
| 2020/0152363 | A1 | 5/2020 | Kubota et al. | |
| 2020/0399731 | A1* | 12/2020 | Ichie | ................ H01F 1/14775 |
| 2021/0159002 | A1 | 5/2021 | Okubo et al. | |
| 2022/0018022 | A1* | 1/2022 | Jang | ................. C23C 16/45519 |
| 2023/0045797 | A1* | 2/2023 | Lee | ........................ C21D 6/005 |

FOREIGN PATENT DOCUMENTS

| | | | |
|---|---|---|---|
| CN | 104226954 | A * | 12/2014 |
| EP | 3633059 | A1 | 4/2020 |
| JP | 58164724 | A | 9/1983 |
| JP | 11343544 | A | 12/1999 |
| JP | 2000160303 | A * | 6/2000 |
| JP | 2011246810 | A | 12/2011 |
| JP | 2018021241 | A | 2/2018 |
| JP | 2018021242 | A * | 2/2018 |
| TW | 201233813 | A | 8/2012 |
| TW | 201329244 | A | 7/2013 |
| WO | 2018025941 | A1 | 2/2018 |
| WO | 2018117597 | A1 | 6/2018 |
| WO | 2018117640 | A1 | 6/2018 |
| WO | 2018147044 | A1 | 8/2018 |
| WO | 2018179871 | A1 | 10/2018 |
| WO | 2018220837 | A1 | 12/2018 |
| WO | 2018221126 | A1 | 12/2018 |

OTHER PUBLICATIONS

Canadian Examination Report for Canadian Application No. 3,122,122, dated Mar. 22, 2022, 4 pages.
International Search Report and Written Opinion for International Application No. PCT/JP2019/033418, dated Nov. 19, 2019, 4 pages.
Taiwanese Office Action for Taiwanese Application No. 108140000, dated Apr. 23, 2020. with Partial English Translation, 4 pages.
Chinese Office Action with Search Report for Chinese Application No. 201980079663.8, dated Apr. 29, 2022, 10 pages.

* cited by examiner

NON-ORIENTED ELECTRICAL STEEL SHEET AND METHOD FOR PRODUCING SAME

CROSS REFERENCE TO RELATED APPLICATIONS

This is the U.S. National Phase application of PCT/JP2019/033418, filed Aug. 27, 2019, which claims priority to Japanese Patent Application No. 2018-245507, filed Dec. 27, 2018, the disclosures of each of these applications being incorporated herein by reference in their entireties for all purposes.

FIELD OF THE INVENTION

This invention relates to a non-oriented electrical steel sheet and a method for producing the same, and more particularly to a non-oriented electrical steel sheet being low in the iron loss at a high frequency area and a method for producing the same.

BACKGROUND OF THE INVENTION

Recently, the reduction of $CO_2$ emission amount and energy saving have been demanded in consideration of environmental issue such as global warming or the like. In the field of automobiles, therefore, there have been promoted the development of hybrid electric vehicles (HEV) using an engine and motor in combination, electric vehicles (EV) driven only by an electric motor, fuel cell vehicles (FCEV) and so on. The motors used in HEV, EV, FCEV and the like are generally driven in a high frequency area which is favorable for high-speed revolution for the higher motor efficiency. Non-oriented electrical steel sheets are frequently used as an iron core material of the motors, and in order to attain the high efficiency of the motor, the non-oriented electrical steel sheets are strongly demanded to have low iron loss in the high frequency area.

Attempt has hitherto been made to reduce an iron loss in non-oriented electrical steel sheets by adding an alloying element such as Si, Al or the like to increase a specific resistance or thinning the sheet thickness to reduce an eddy current loss. The addition of a large amount of the alloying element can reduce the iron loss but also brings about decrease in the saturated magnetic flux density, which causes an increase in copper loss in the motor to lead decrease in the motor efficiency. Also, it is necessary to reduce the sheet thickness of a hot-rolled steel sheet or increase the rolling reduction of a cold rolling for the reduction of the sheet thickness, which causes decrease in the productivity. Therefore, it is considered that development of a non-oriented electrical steel sheet having a high magnetic flux density, and a low iron loss at a high frequency, which does not cause decrease in the magnetic flux density and lowering of the productivity, can largely contribute to increase in the efficiency of the electric equipment.

As a method for producing a non-oriented electrical steel sheet with a low iron loss in the high frequency area, For example, Patent Literature 1 discloses a method of reducing an iron loss in the high frequency area by adding Cr to thereby increase the specific resistance of steel.

PATENT LITERATURE

Patent Literature 1: JP-A-H11-343544

SUMMARY OF THE INVENTION

Since Cr is an element decreasing the saturated magnetic flux density, the technique disclosed in Patent Literature 1 cannot achieve the high magnetic flux density, and the low iron loss at a high frequency and cannot meet recent demand for non-oriented electrical steel sheets sufficiently.

The invention is made in consideration of the above problem inherent to the conventional technique, and an object thereof is to provide a non-oriented electrical steel sheet with a high magnetic flux density, and a low iron loss at a high frequency without causing decrease in magnetic flux density or productivity, and also to propose an advantageous method for producing the same.

The inventors have made various studies, focusing on the influence of a surface state upon the magnetic properties of a non-oriented electrical steel sheet to solve the above task. Consequently, they have found out that the iron loss can be reduced by controlling a Zn content in steel to a given range and further controlling both a nitrogen content in steel in a surface layer of the steel sheet after finish annealing and a nitrogen content in steel in full thickness thereof without attracting the decrease of the magnetic flux density, and the invention has been accomplished.

The invention according to exemplary embodiments is based on the above knowledge and is a non-oriented electrical steel sheet having a chemical composition comprising C: not more than 0.0050 mass %, Si: 2.8 to 6.5 mass %, Mn: 0.05 to 2.0 mass %, P: not more than 0.10 mass %, S: not more than 0.0050 mass %, Al: 0.3 to 2.0 mass %, N: not more than 0.0050 mass %, Zn: 0.0005 to 0.0050 mass %, Ti: not more than 0.0030 mass %, Nb: not more than 0.0030 mass %, O: not more than 0.0050 mass % and the remainder being Fe and inevitable impurities, in which t, $N_1$ and $N_2$ satisfy the following equation (1):

$$(t \times N_2)/\{(t/10) \times N_1\} \geq 5.0 \qquad (1),$$ where t (mm) represents a steel sheet thickness, $N_1$ (mass %) represents a concentration of nitrogen present as AlN in a layer from a one-side surface of the steel sheet to a depth of 1/20 of the sheet thickness, and $N_2$ (mass %) represents a nitrogen concentration present as AlN in an entire sheet thickness.

The non-oriented electrical steel sheet according to embodiments of the invention is characterized by further containing one or two selected from Sn: 0.005 to 0.20 mass % and Sb: 0.005 to 0.20 mass %, in addition to the above chemical composition.

The non-oriented electrical steel sheet according to embodiments of the invention is characterized by further containing at least one group selected from the following group A and group B, in addition to the above chemical composition:

Group A: one or more selected from Ca, Mg and REM by 0.0005 to 0.020 mass % in total;
Group B: one or more selected from Cu, Ni and Cr by 0.01 to 1.0 mass % in total.

Also, the non-oriented electrical steel sheet according to embodiments of the invention is characterized by having a sheet thickness of not more than 0.30 mm.

Further, the invention according to exemplary embodiments proposes a method for producing a non-oriented electrical steel sheet comprising subjecting a steel slab having any one of the chemical composition described above to a hot rolling, a hot-band annealing, a single cold rolling or two or more cold rollings with an intermediate annealing between each rolling to a final sheet thickness, and then a finish annealing, characterized in that each dew point of a heating zone and a soaking zone in the hot-band annealing is controlled to a range of 0 to 70° C. and an atmosphere of the finish annealing is a mixed gas of one or more selected from nitrogen, hydrogen and a noble gas and has a nitrogen content of not more than 30 vol % and a dew point of not higher than −20° C.

The method for producing a non-oriented electrical steel sheet according to embodiments of the invention is characterized by having the final sheet thickness of not more than 0.30 mm.

The present invention can reduce an iron loss at a high frequency without causing decrease in magnetic flux density, and thus, the non-oriented electrical steel sheet according to the invention can be favorably used as a material for a motor core of the hybrid electric vehicle, electric vehicle, high-speed generator, air compressor, cleaner, machine tool and so on.

DETAILED DESCRIPTION OF EMBODIMENTS OF THE INVENTION

There will be first described an experiment leading to the development of exemplary embodiments of the invention.
<Experiment 1>

A steel comprising C: 0.0025 mass %, Si: 3.3 mass %, Mn: 0.6 mass %, P: 0.01 mass %, S: 0.0022 mass %, Al: 0.9 mass %, N: 0.0019 mass %, Ti: 0.0011 mass %, Nb: 0.0009 mass %, 0: 0.0024 mass %, Zn: varying within the range of 0.0001 to 0.01 mass % and the remainder being Fe and inevitable impurities is melted in a vacuum furnace and cast into a steel ingot, and hot rolled to form a hot-rolled sheet having a sheet thickness of 2.0 mm. Then, the hot-rolled sheet is subjected to a hot-band annealing at 950° C. for 30 seconds (dew point of a heating zone and soaking zone: 55° C.), a pickling, a cold-rolling to form a cold-rolled sheet having a final sheet thickness of 0.25 mm, and a finish annealing in an atmosphere having a ratio by vol % of $H_2$: $N_2$=30:70 and a dew point of −55° C. at 1025° C. for 10 seconds.

Figure 1:
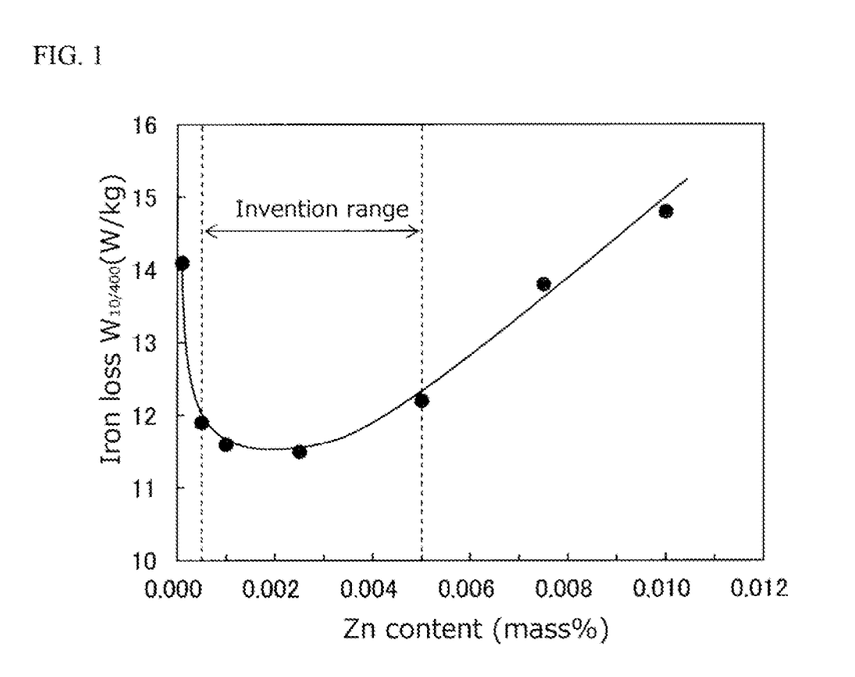
FIG. 1 is a graph showing an influence of a Zn content upon an iron loss at a high frequency.

Test specimens with a width of 30 mm and a length of 180 mm are taken out from the rolling direction (L-direction) and the widthwise direction (C-direction) of the obtained finish-annealed sheet to measure an iron loss $W_{10/400}$ at a high frequency in (L+C) directions by an Epstein test. FIG. 1 shows the above measurement results, in which the iron loss decreases when Zn content falls within the range of 0.0005 to 0.0050 mass %.

In order to examine the cause of the decrease in iron loss by the addition of the slight amount of Zn, a cross section of each steel sheet in the rolling direction after the finish annealing is observed with a SEM (scanning electron microscope). As a result, fine AN precipitates are observed in the steel sheet surface layer, specifically in the layer from the surface of one side of the steel sheet to a depth of 1/20 of the thickness, in the steel sheet where increase in the iron loss is confirmed, from which it is presumed that the fine nitride causes the increase in the iron loss.

Figure 2:
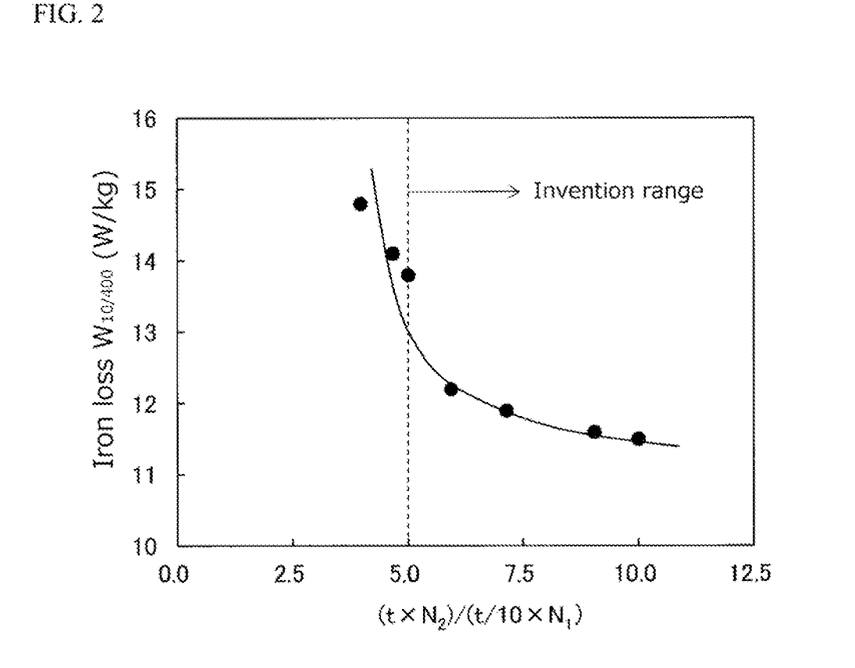
FIG. 2 is a graph showing an influence of a ratio of a nitrogen content present as AlN in a surface layer to that in an entire sheet thickness upon an iron loss at a high frequency.

The steel sheet after the finish annealing is analyzed by electrolytic extraction to measure a concentration $N_1$ (mass %) of N present as AlN in the layer from one side surface to a depth of 1/20 of the sheet thickness and a concentration $N_2$ (mass %) present as AlN in an entire thickness of the steel sheet. As a result, it is confirmed that the ratio of the amount of nitrogen forming AlN in the entire thickness of the steel sheet to the amount of nitrogen forming AlN in the layer from one side surface to a depth of 1/20 of the thickness (surface layer) of the steel sheet, as represented by an equation (1):

$$(t \times N_2)/\{(t/10) \times N_1\} \geq 5.0 \quad (1),$$

has a strong correlation with iron loss property. FIG. 2 shows a relationship between the ratio of the amount of nitrogen forming AlN in the entire sheet thickness to the amount of nitrogen forming AlN in the surface layer (left side of the equation (1)) and the iron loss $W_{10/400}$. From the FIG. 2, it can be seen that the iron loss largely deceases when the ratio is not less than 5.0 and that the Zn content is within the range of 0.0005 to 0.0050 mass % in the steel sheets having the above ratio of not less than 5.0.

From the above experimental result, it is considered that the decrease in the iron loss in the steel sheet that has been added with the slight amount of Zn is caused by the formation of an oxide film of zinc in the surface layer of the steel sheet during the finish annealing to suppress the penetration (nitriding) of nitrogen into the steel sheet.
<Experiment 2>

There is examined an influence of a dew point in the hot-band annealing upon the magnetic properties.

A steel having a chemical composition comprising C: 0.0021 mass %, Si: 3.7 mass %, Mn: 0.4 mass %, P: 0.01 mass %, S: 0.0016 mass %, Al: 0.6 mass %, N: 0.0022 mass %, Zn: 0.0028 mass %, Ti: 0.0014 mass %, Nb: 0.0010 mass %, 0: 0.0025 mass % and the remainder being Fe and inevitable impurities is melted in a vacuum furnace, cast into a steel ingot, hot rolled to form a hot-rolled sheet having a sheet thickness of 1.8 mm, and is subjected to a hot-band annealing at 900° C. for 30 seconds. In this process, the dew point in the hot-band annealing (heating zone, soaking zone) is varied within the range of −30° C. to 70° C. Thereafter, the steel sheet after the hot-band annealing is pickled, cold rolled to form a cold-rolled sheet having a final sheet thickness of 0.20 mm, and is subjected to a finish annealing in an atmosphere having a ratio of $H_2$: $N_2$=50:50 by vol % and a dew point of −55° C. at 1000° C. for 10 seconds.

Figure 3:
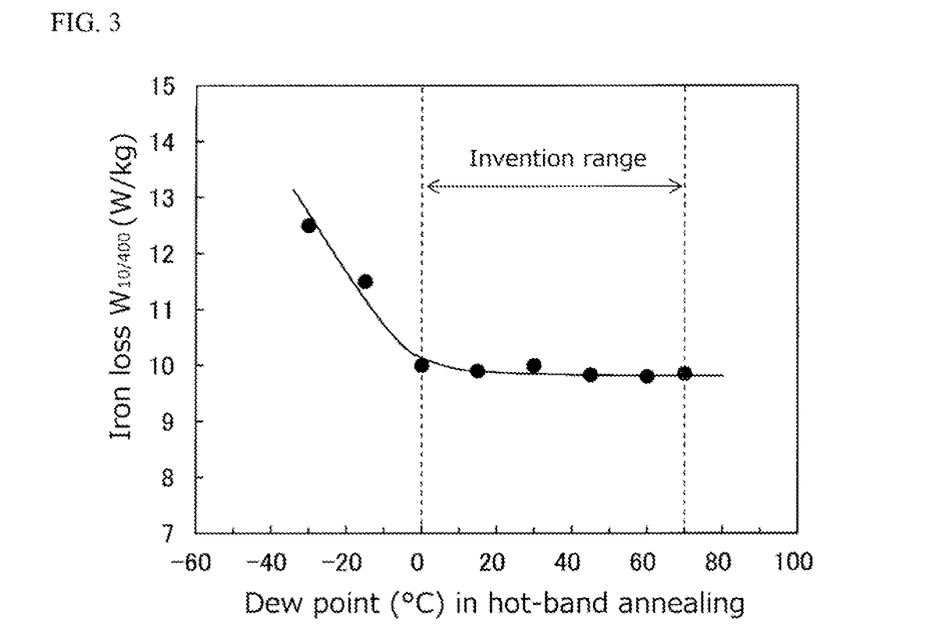
FIG. 3 is a graph showing an influence of a dew point in a hot-band annealing upon an iron loss at a high frequency.

Next, test specimens with a width of 30 mm and a length of 180 mm are taken out from the rolling direction (L-direction) and the widthwise direction (C-direction) in the steel sheet after the finish annealing to measure magnetic properties in (L+C) directions by an Epstein test. The measurement result is shown in FIG. 3, from which it can be seen that excellent iron loss properties can be obtained by controlling the dew point in the hot-band annealing to not lower than 0° C.

<Experiment 3>

There is examined an influence of a dew point in the hot-band annealing upon the magnetic properties.

A steel having a chemical composition comprising C: 0.0028 mass %, Si: 3.6 mass %, Mn: 0.4 mass %, P: 0.01 mass %, S: 0.0018 mass %, Al: 1.2 mass %, N: 0.0021 mass %, Zn: 0.0025 mass %, Ti: 0.0013 mass %, Nb: 0.0009 mass %, O: 0.0024 mass % and the remainder being Fe and inevitable impurities is melted in a vacuum furnace, cast into a steel ingot, hot rolled to form a hot-rolled sheet having a sheet thickness of 1.8 mm, and subjected to a hot-band annealing (dew point of heating zone and soaking zone: 65° C.) at 920° C. for 30 seconds, pickled, cold rolled to form a cold-rolled sheet having a final sheet thickness of 0.27 mm and subjected to a finish annealing at 1020° C. for 10 seconds. In this process, an atmosphere of the finish annealing is a mixed gas of hydrogen and nitrogen (dew point: −55° C.), and a nitrogen partial pressure of the mixed atmosphere is variously changed within the range of 0 to 100 vol %.

Figure 4:
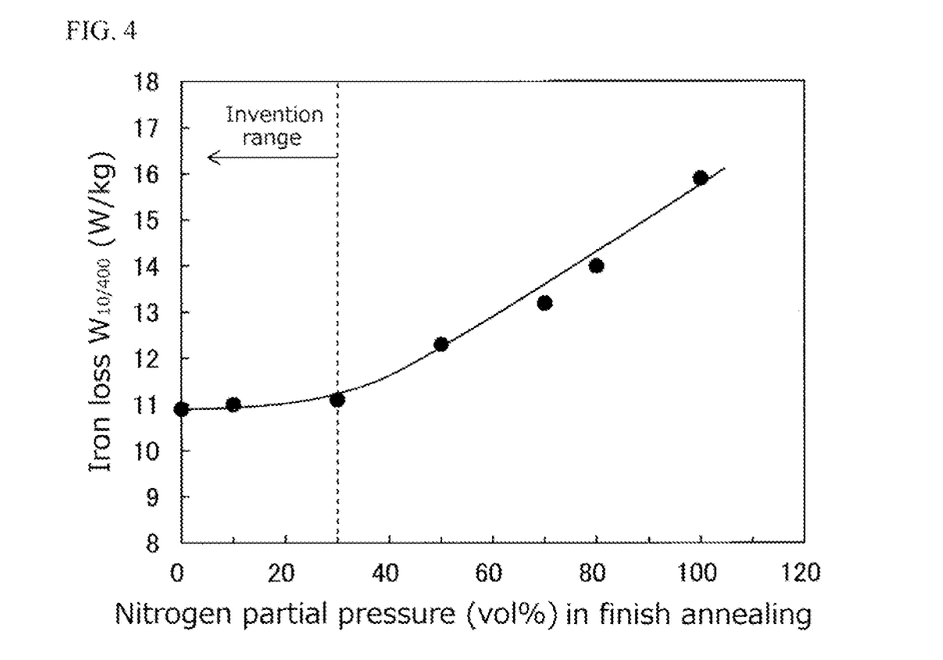
FIG. 4 is a graph showing an influence of a nitrogen partial pressure in a finish annealing upon an iron loss at a high frequency.

Test specimens with a width of 30 mm and a length of 180 mm are taken out from the rolling direction (L-direction) and the widthwise direction (C-direction) of the steel sheet after the finish annealing to measure the magnetic properties in (L+C) directions by an Epstein test. The result is shown in FIG. 4, from which it can be seen that excellent iron loss property can be obtained by reducing the nitrogen partial pressure in the finish annealing to not more than 30 vol %.

The invention has been completed by further studying the above results of Experiment 1 to Experiment 3.

There will be described the reason for limiting the chemical composition of the non-oriented electrical steel sheet according to embodiments of the invention.

C: not more than 0.0050 mass %

C contained in the product sheet is a harmful element deteriorating the iron loss property by causing magnetic aging to form and precipitate carbides. Therefore, C contained in the raw material is limited to not more than 0.0050 mass %, preferably not more than 0.0040 mass %. Moreover, the lower limit of C is not particularly defined, but is preferable to be about 0.0001 mass % from a viewpoint of suppressing decarburization cost in a refining process.

Si: 2.8 to 6.5 mass %

Si has an effect of increasing a specific resistance of steel to reduce the iron loss. Si also has an effect of increasing the strength of steel by solid-solution strengthening, so that it is contained by not less than 2.8 mass %. On the other hand, when the content exceeding 6.5 mass % causes the rolling to be difficult, so that the upper limit is 6.5 mass %. Si is preferably contained within the range of 3.0 to 6.0 mass %.

Mn: 0.05 to 2.0 mass %

Mn is an element useful for increasing the specific resistance and strength of steel like Si. Mn, an element also forming a sulfide to improve hot brittleness, is contained by not less than 0.05 mass %. On the other hand, the content exceeding 2.0 mass % causes slab cracking or the like to deteriorate the operability in steelmaking, so that the upper limit is 2.0 mass %. Preferably, Mn content falls within the range of 0.1 to 1.5 mass %.

P: not more than 0.10 mass %

P is an element having an effect of increasing the specific resistance to largely reduce an eddy current loss, so that it can be added in an adequate amount. However, the excessive addition of P brings about the deterioration of cold-rolling property, so that the upper limit is 0.10 mass %, preferably not more than 0.05 mass %.

S: not more than 0.0050 mass %

S forms precipitates and inclusions as a sulfide and deteriorates the productivity (hot-rolling property) and the magnetic properties of the product sheet, so that the less content is more preferable. In embodiments of the invention, therefore, the upper limit of S is 0.0050 mass %, preferably, not more than 0.0030 mass %.

Al: 0.3 to 2.0 mass %

Al has an effect of increasing the specific resistance of steel to reduce the iron loss like Si. However, the Al content exceeding 2.0 mass % causes embrittlement of steel and the rolling to be difficult, so that the upper limit is 2.0 mass %. On the other hand, when the Al content is less than 0.3 mass %, fine nitrides are formed and precipitated to rather deteriorate the iron loss property, so that the lower limit is 0.3 mass %. Preferably, Al content falls with the range of 0.4 to 1.5 mass %.

N: not more than 0.0050 mass %

N is a harmful element forming a nitride to deteriorate magnetic properties, so that the N content is limited to not more than 0.0050 mass %, preferably, not more than 0.0040 mass %.

Zn: 0.0005 to 0.0050 mass %

Zn has an effect of suppressing nitriding in the finish annealing as explained in Experiment 3, and accordingly, it is added by not less than 0.0005 mass %. On the other hand, an addition exceeding 0.0050 mass % causes formation of sulfide to rather increase the iron loss, so that it is limited to not more than 0.0050 mass %. Preferably, it falls within the range of 0.001 to 0.004 mass %.

Zn, which is an element having a high vapor pressure, is not usually incorporating into steel, but it may be incorporated when scrap is added to molten steel after deoxidation in a refining process for the purpose of temperature control or the like. Accordingly, it is important to carefully select the raw steel material and scrap to be used to control the Zn content to a proper range.

Ti: not more than 0.0030 mass %, Nb: not more than 0.0030 mass %

Ti and Nb are harmful elements forming fine carbonitride to be precipitated to increase the iron loss. In particular, when they exceed 0.0030 mass %, the above harmful effect becomes remarkable, so that the upper limit of each element is 0.0030 mass %, preferably not more than 0.0020 mass %.

O: not more than 0.0050 mass %

O is a harmful element forming an oxide to deteriorate the magnetic properties, and thus limited to not more than 0.0050 mass %, preferably, not more than 0.0040 mass %.

In the non-oriented electrical steel sheet according to embodiments of the invention, the residue other than the above ingredients is Fe and inevitable impurities, but may contain the following ingredients depending on properties to be demanded in addition to the aforementioned ingredients.

Sn: 0.005 to 0.20 mass %, Sb: 0.005 to 0.20 mass %

Sn and Sb have an effect of improving recrystallization texture to improve the magnetic flux density and the iron loss. In order to obtain such an effect, each element needs to be added not by less than 0.005 mass %. However, the above effect is saturated when the elements are added by more than 0.20 mass %. Therefore, when Sn and Sb are added, each element is preferable to fall within the range of 0.005 to 0.20 mass %.

Ca, Mg and REM: 0.0005 to 0.020 mass % in total

Ca, Mg and REM (rare earth metal) have an effect of forming stable sulfides to improve grain growth property. In order to obtain such an effect, Ca, Mg and REM are necessary to be added by not less than 0.0005 mass % in total. However, when they are added by more than 0.020 mass %, the above effect is saturated. Therefore, when Ca, Mg and REM are added, the total content is preferable to fall within the range of 0.0005 to 0.020 mass %.

Cu, Ni and Cr: 0.01 to 1.0 mas% in total

Cu, Ni and Cr have an effect of increasing the specific resistance of steel to reduce the iron loss and increase the strength of steel. In order to obtain such an effect, Cu, Ni and Cr are necessary to be added by not less than 0.01 mass % in total. However, the addition of more than 1.0 mass % brings about cost increase in the raw material. Therefore, when Cu, Ni and Cr are added, the total content is preferable to fall within the range of 0.01 to 1.0 mass %, more preferably the range of 0.1 to 0.5 mass %.

There will be described a method for producing the non-oriented electrical steel sheet according to exemplary embodiments of the invention.

A non-oriented electrical steel sheet according to the invention can be produced by a method comprising a series of steps of
producing a raw steel material (slab) having the above chemical composition,
hot rolling the slab to form a hot-rolled sheet,
subjecting the hot-rolled sheet to a hot-band annealing and a single cold rolling or two or more cold rollings having an intermediate annealing between each cold rolling to form a cold-rolled sheet with a final sheet thickness,
and subjecting the cold-rolled sheet to a finish annealing.

The method will be explained in details below.

Firstly, the steel slab to be used in the production of the non-oriented electrical steel sheet according to the invention can be produced by melting a steel having a chemical composition adapted according to embodiments of the invention through a well-known refining process using a converter, an electric furnace, a vacuum degassing device or the like followed by a usual continuous casting method or a usual ingot making—blooming method. Moreover, a thin cast slab having a thickness of not more than 100 mm may be produced by a direct casting method.

The steel slab is hot rolled by a well-known method to form a hot-rolled sheet. In this case, the steel slab is usually reheated to a determined temperature in a heating furnace and subjected to the hot rolling, or may be subjected to the hot rolling immediately after the casting without reheating. When a thin cast slab is used, it may be hot rolled or may be subjected to the subsequent process without hot rolling.

The hot-band annealing subsequent to the hot rolling is preferably conducted at a soaking temperature within the range of 800 to 1100° C. When it is lower than 800° C., the effect by the hot-band annealing is small and the effect of improving the magnetic properties cannot be sufficiently obtained. When it exceeds 1100° C., on the other hand, the crystal grains are coarsened to promote brittle fracture (sheet breakage) in the cold rolling or to cause disadvantage in the production cost. Further, the soaking time is preferable to be not more than 3 minutes from a viewpoint of ensuring the productivity. More preferably, the soaking temperature falls within the range of 850 to 1000° C. and the soaking time is not more than 1 minute.

Moreover, the dew point of a heating zone and soaking zone in the hot-band annealing is necessary to be set not lower than 0° C. but not higher than 70° C. When the dew point is lower than 0° C., an oxide layer formed on the surface in the annealing is easily removed in the pickling and nitriding is easily caused in the finish annealing to bring about an increase in the iron loss. While when the dew point is higher than 70° C., the oxidation on the steel sheet surface is too promoted and it is difficult to remove scales formed in the annealing and the pickling load is increased to block the productivity.

Next, the steel sheet after the hot-band annealing is subjected to a single cold rolling or two or more cold rollings having an intermediate annealing between each cold rolling to form a cold-rolled sheet with a final sheet thickness. The final sheet thickness (product sheet thickness) in the cold rolling is preferable to be not more than 0.30 mm from a viewpoint of obtaining the effect of reducing the iron loss.

Next, the cold-rolled sheet is subjected to a finish annealing and applied with an insulation coating as required, to form a product sheet. The soaking condition in the finish annealing is preferable to have a soaking temperature: 900 to 1200° C. and a soaking time: 1 to 120 seconds, from a viewpoint of coarsening the crystal grain size to reduce the iron loss. More preferably, it is preferable have a soaking temperature: 1000 to 1100° C. and a soaking time: 5 to 60 seconds.

In the finish annealing, it is important to control the atmosphere and the dew point to proper ranges in order to suppress nitriding from the surface of the steel sheet to reduce the nitrogen amount present on the surface layer of the steel sheet as AlN. Concretely, the atmosphere gas in the finish annealing is a mixed gas of one or more selected from $N_2$, $H_2$ and noble gas, from a viewpoint of suppressing the nitriding in the annealing, and it is necessary that the content of $N_2$ in the atmosphere gas is not more than 30 vol %. For example, the atmosphere preferably has a ratio by vol % of $H_2$: $N_2$=80:20. A preferable nitrogen partial pressure is not more than 50 vol %. Also, the dew point is necessary to be not higher than −20° C. from a viewpoint of preventing oxidation of the steel sheet surface. Preferably, the dew point is not higher than −40° C.

EXAMPLE

A slab having a chemical composition shown in Table 1 is heated to 1120° C. for 30 minutes and hot rolled to form a hot-rolled sheet having a sheet thickness of 1.8 mm. Then, the hot-rolled sheet is subjected to a hot-band annealing under conditions shown in Table 2, pickled, cold rolled to form a cold-rolled sheet with a final sheet thickness shown in Table 2, and then subjected to a finish annealing under conditions also shown in Table 2 to form a product sheet.

A sample is taken out from the thus-obtained product sheet. Then, test specimens with a width of 30 mm and a length of 180 mm are taken out from the rolling direction (L-direction) and the widthwise direction (C-direction) of the sample to measure an iron loss $W_{10/400}$ in (L+C) directions by an Epstein test. Also, another test specimen is taken out from the sample and analyzed by electrolytic extraction to measure nitrogen concentration $N_1$ (mass %) present as AlN from the one-side surface of the steel sheet to a depth of 1/20 of the sheet thickness, a nitrogen concentration $N_2$ (mass %) present as AlN in the entire sheet thickness, and a ratio of the nitrogen amount in the entire sheet thickness to the nitrogen amount from the one-side surface of the steel sheet to a depth of 1/20 of the sheet thickness $((t \times N_2)/\{(t/10) \times N_1\})$.

The above measurement result is also shown in Table 2. As seen from the result, all the steel sheets produced with the raw steel materials (slabs) having the chemical composition adapted according to embodiments of the invention under the conditions adapted according to embodiments of the invention have an excellent iron loss property.

TABLE 1-1

Chemical composition (mass %)

| Steel No. | C | Si | Mn | P | S | Al | N | Zn | Ti | Nb | O | Sn | Sb | Ca, Mg, REM | Cu, Ni, Cr | Remarks |
|---|---|---|---|---|---|---|---|---|---|---|---|---|---|---|---|---|
| 1 | 0.0025 | 3.6 | 0.4 | 0.01 | 0.0018 | 0.8 | 0.0027 | 0.0021 | 0.0011 | 0.0009 | 0.0024 | 0.04 | — | — | — | Invention steel |
| 2 | 0.0025 | 3.6 | 0.4 | 0.01 | 0.0018 | 0.8 | 0.0027 | 0.0021 | 0.0011 | 0.0009 | 0.0024 | 0.04 | — | — | — | Invention steel |
| 3 | 0.0025 | 3.6 | 0.4 | 0.01 | 0.0018 | 0.8 | 0.0027 | 0.0021 | 0.0011 | 0.0009 | 0.0024 | 0.04 | — | — | — | Invention steel |
| 4 | 0.0025 | 3.6 | 0.4 | 0.01 | 0.0018 | 0.8 | 0.0027 | 0.0021 | 0.0011 | 0.0009 | 0.0024 | 0.04 | — | — | — | Invention steel |
| 5 | 0.0025 | 3.6 | 0.4 | 0.01 | 0.0018 | 0.8 | 0.0027 | 0.0003 | 0.0011 | 0.0009 | 0.0024 | 0.04 | — | — | — | Comparative steel |
| 6 | 0.0025 | 3.8 | 0.5 | 0.01 | 0.0019 | 0.6 | 0.0024 | 0.0029 | 0.0013 | 0.0011 | 0.0025 | — | — | — | — | Invention steel |
| 7 | 0.0025 | 3.8 | 0.5 | 0.01 | 0.0019 | 0.6 | 0.0024 | 0.0029 | 0.0013 | 0.0011 | 0.0025 | — | — | — | — | Invention steel |
| 8 | 0.0025 | 3.8 | 0.5 | 0.01 | 0.0019 | 0.6 | 0.0024 | 0.0029 | 0.0013 | 0.0011 | 0.0025 | — | — | — | — | Invention steel |
| 9 | 0.0025 | 3.8 | 0.5 | 0.01 | 0.0019 | 0.6 | 0.0024 | 0.0029 | 0.0013 | 0.0011 | 0.0025 | — | — | — | — | Invention steel |
| 10 | 0.0025 | 3.8 | 0.5 | 0.01 | 0.0019 | 0.6 | 0.0024 | 0.0029 | 0.0013 | 0.0011 | 0.0025 | — | — | — | — | Invention steel |
| 11 | 0.0025 | 3.8 | 0.5 | 0.01 | 0.0019 | 0.6 | 0.0024 | 0.0029 | 0.0013 | 0.0011 | 0.0025 | — | — | — | — | Invention steel |
| 12 | 0.0028 | 3.2 | 0.8 | 0.01 | 0.0024 | 1.2 | 0.0019 | 0.0024 | 0.0008 | 0.0012 | 0.0021 | 0.03 | — | — | — | Invention steel |
| 13 | 0.0028 | 3.2 | 0.8 | 0.01 | 0.0024 | 1.8 | 0.0020 | 0.0024 | 0.0008 | 0.0012 | 0.0021 | 0.03 | — | — | — | Invention steel |
| 14 | 0.0029 | 3.5 | 2.5 | 0.01 | 0.0024 | 0.5 | 0.0028 | 0.0021 | 0.0008 | 0.0011 | 0.0021 | — | — | — | — | Comparative steel |
| 15 | 0.0025 | 3.3 | 0.1 | 0.01 | 0.0024 | 2.5 | 0.0021 | 0.0015 | 0.0008 | 0.0011 | 0.0021 | — | — | — | — | Comparative steel |
| 16 | 0.0019 | 4.2 | 0.3 | 0.01 | 0.0015 | 0.3 | 0.0027 | 0.0026 | 0.0014 | 0.0012 | 0.0019 | — | 0.01 | — | — | Invention steel |
| 17 | 0.0019 | 5.6 | 0.3 | 0.01 | 0.0015 | 0.3 | 0.0027 | 0.0027 | 0.0014 | 0.0012 | 0.0019 | — | — | — | — | Invention steel |
| 18 | 0.0022 | 7.2 | 0.2 | 0.01 | 0.0024 | 0.3 | 0.0028 | 0.0038 | 0.0008 | 0.0011 | 0.0021 | — | — | — | — | Comparative steel |
| 19 | 0.0021 | 4.0 | 0.4 | 0.01 | 0.0026 | 0.6 | 0.0024 | 0.0032 | 0.0011 | 0.0013 | 0.0028 | 0.03 | — | — | — | Invention steel |
| 20 | 0.0021 | 4.1 | 0.4 | 0.01 | 0.0026 | 0.6 | 0.0024 | 0.0032 | 0.0011 | 0.0013 | 0.0028 | 0.03 | — | — | — | Invention steel |
| 21 | 0.0026 | 3.2 | 0.1 | 0.25 | 0.0026 | 1.5 | 0.0024 | 0.0025 | 0.0011 | 0.0013 | 0.0028 | 0.06 | — | — | — | Comparative steel |
| 22 | 0.0024 | 3.4 | 1.2 | 0.01 | 0.0019 | 0.9 | 0.0021 | 0.0024 | 0.0016 | 0.0014 | 0.0027 | 0.03 | — | — | — | Invention steel |
| 23 | 0.0024 | 3.3 | 1.8 | 0.01 | 0.0019 | 0.7 | 0.0021 | 0.0024 | 0.0016 | 0.0014 | 0.0027 | 0.03 | — | — | — | Invention steel |
| 24 | 0.0018 | 3.5 | 0.2 | 0.01 | 0.0015 | 0.9 | 0.0021 | 0.0021 | 0.0012 | 0.0009 | 0.0027 | — | 0.05 | — | — | Invention steel |

TABLE 1-2

Chemical composition (mass %)

| Steel No. | C | Si | Mn | P | S | Al | N | Zn | Ti | Nb | O | Sn | Sb | Ca, Mg, REM | Cu, Ni, Cr | Remarks |
|---|---|---|---|---|---|---|---|---|---|---|---|---|---|---|---|---|
| 25 | 0.0017 | 3.6 | 0.5 | 0.01 | 0.0024 | 0.8 | 0.0021 | 0.0027 | 0.0016 | 0.0014 | 0.0027 | — | — | Ca: 0.0034 | — | Invention steel |
| 26 | 0.0017 | 3.6 | 0.5 | 0.01 | 0.0026 | 0.8 | 0.0021 | 0.0027 | 0.0016 | 0.0014 | 0.0027 | — | — | Mg: 0.0025 | — | Invention steel |
| 27 | 0.0017 | 3.6 | 0.5 | 0.01 | 0.0027 | 0.8 | 0.0021 | 0.0027 | 0.0016 | 0.0014 | 0.0027 | — | — | REM: 0.0072 | — | Invention steel |
| 28 | 0.0025 | 3.3 | 0.6 | 0.01 | 0.0059 | 0.9 | 0.0026 | 0.0019 | 0.0018 | 0.0013 | 0.0029 | 0.04 | — | — | — | Comparative steel |
| 29 | 0.0025 | 3.8 | 0.2 | 0.01 | 0.0015 | 0.5 | 0.0026 | 0.0021 | 0.0041 | 0.0013 | 0.0029 | 0.04 | — | — | — | Comparative steel |
| 30 | 0.0025 | 3.8 | 0.2 | 0.01 | 0.0015 | 0.5 | 0.0026 | 0.0021 | 0.0007 | 0.0038 | 0.0029 | 0.04 | — | — | — | Comparative steel |
| 31 | 0.0025 | 3.8 | 0.2 | 0.01 | 0.0015 | 0.5 | 0.0026 | 0.0021 | 0.0007 | 0.0011 | 0.0064 | 0.04 | — | — | — | Comparative steel |
| 32 | 0.0025 | 3.8 | 0.2 | 0.01 | 0.0015 | 0.5 | 0.0065 | 0.0021 | 0.0007 | 0.0011 | 0.0021 | 0.04 | — | — | — | Comparative steel |
| 33 | 0.0021 | 4.1 | 0.5 | 0.01 | 0.0023 | 0.7 | 0.0022 | 0.0024 | 0.0012 | 0.0013 | 0.0023 | 0.03 | — | — | — | Invention steel |
| 34 | 0.0021 | 4.1 | 0.5 | 0.01 | 0.0023 | 0.7 | 0.0022 | 0.0024 | 0.0012 | 0.0013 | 0.0023 | 0.03 | — | — | — | Invention steel |
| 35 | 0.0021 | 4.1 | 0.5 | 0.01 | 0.0023 | 0.7 | 0.0022 | 0.0024 | 0.0012 | 0.0013 | 0.0023 | 0.03 | — | — | — | Invention steel |
| 36 | 0.0026 | 3.4 | 0.9 | 0.01 | 0.0026 | 1.4 | 0.0023 | 0.0019 | 0.0018 | 0.0012 | 0.0021 | 0.03 | — | — | — | Invention steel |
| 37 | 0.0026 | 3.4 | 0.9 | 0.01 | 0.0026 | 1.4 | 0.0023 | 0.0019 | 0.0018 | 0.0012 | 0.0021 | 0.03 | — | — | — | Invention steel |
| 38 | 0.0026 | 3.4 | 0.9 | 0.01 | 0.0026 | 1.4 | 0.0023 | 0.0019 | 0.0018 | 0.0012 | 0.0021 | 0.03 | — | — | — | Invention steel |
| 39 | 0.0025 | 3.7 | 0.8 | 0.01 | 0.0021 | 0.8 | 0.0031 | 0.0021 | 0.0013 | 0.0013 | 0.0032 | 0.03 | — | Ca: 0.0029 | — | Invention steel |
| 40 | 0.0021 | 3.5 | 0.9 | 0.01 | 0.0017 | 0.6 | 0.0023 | 0.0019 | 0.0011 | 0.0009 | 0.0019 | 0.04 | — | — | Cu: 0.3 | Invention steel |
| 41 | 0.0021 | 3.3 | 0.9 | 0.01 | 0.0017 | 1.2 | 0.0023 | 0.0019 | 0.0012 | 0.0009 | 0.0019 | 0.03 | — | — | Ni: 0.2 | Invention steel |
| 42 | 0.0021 | 3.4 | 0.6 | 0.01 | 0.0017 | 1.0 | 0.0024 | 0.0019 | 0.0018 | 0.0009 | 0.0019 | 0.03 | — | — | Cr: 0.5 | Invention steel |
| 43 | 0.0021 | 3.6 | 0.5 | 0.01 | 0.0017 | 0.9 | 0.0025 | 0.0019 | 0.0013 | 0.0009 | 0.0019 | 0.03 | — | — | Cu: 0.2, Cr: 0.3 | Invention steel |
| 44 | 0.0025 | 3.7 | 0.6 | 0.01 | 0.0015 | 0.8 | 0.0025 | 0.0019 | 0.0011 | 0.0009 | 0.0019 | 0.03 | — | — | Cu: 0.2, Ni: 0.1 | Invention steel |
| 45 | 0.0026 | 3.1 | 1.2 | 0.01 | 0.0023 | 1.2 | 0.0023 | 0.0019 | 0.0011 | 0.0009 | 0.0019 | 0.03 | — | — | Ni: 0.1, Cr: 0.4 | Invention steel |
| 46 | 0.0022 | 3.1 | 0.9 | 0.01 | 0.0017 | 1.5 | 0.0023 | 0.0019 | 0.0011 | 0.0013 | 0.0019 | 0.03 | — | — | Cu: 0.1, Ni: 0.1, Cr: 0.2 | Invention steel |
| 47 | 0.0021 | 3.4 | 1.2 | 0.008 | 0.0017 | 0.9 | 0.0023 | 0.0019 | 0.0012 | 0.0013 | 0.0019 | 0.03 | — | — | — | Invention steel |
| 48 | 0.0021 | 3.6 | 0.5 | 0.01 | 0.0017 | 0.8 | 0.0023 | 0.0021 | 0.0018 | 0.0013 | 0.0019 | 0.03 | — | — | Cu: 0.02, Ni: 0.03 | Invention steel |

TABLE 1-2-continued

| Steel No. | Chemical composition (mass %) | | | | | | | | | | | | | | |
|---|---|---|---|---|---|---|---|---|---|---|---|---|---|---|---|
| | C | Si | Mn | P | S | Al | N | Zn | Ti | Nb | O | Sn | Sb | Ca, Mg, REM | Cu, Ni, Cr | Remarks |
| 49 | 0.0021 | 3.7 | 0.5 | 0.01 | 0.0017 | 0.5 | 0.0023 | 0.0024 | 0.0013 | 0.0012 | 0.0019 | 0.03 | — | — | Ni: 0.05, Cr: 0.05 | Invention steel |
| 50 | 0.0021 | 3.6 | 0.5 | 0.01 | 0.0017 | 0.9 | 0.0025 | 0.0019 | 0.0013 | 0.0009 | 0.0019 | 0.03 | — | — | Cu: 0.4, Cr: 0.4 | Invention steel |

TABLE 2-1

| | Hot-band annealing conditions | | | Final sheet | Finish annealing conditions | | | | N after finish annealing | | | | |
|---|---|---|---|---|---|---|---|---|---|---|---|---|---|
| Steel No. | temperature (°C.) | Time (sec) | Dew point (°C.) | thickness (mm) | Temperature (°C.) | Time (sec) | Atmosphere (vol %) | Dew point (°C.) | Entire 1/20 layer (mass %) | Left side sheet thickness (mass %) | of equation (1)*1 | Iron loss $W_{10/400}$ (W/kg) | Remarks |
| 1 | 940 | 30 | 60 | 0.25 | 1020 | 10 | N2: H2 = 20:80 | −55 | 0.0032 | 0.0026 | 8.1 | 11.4 | Invention Example |
| 2 | 940 | 30 | 60 | 0.30 | 1020 | 10 | N2: H2 = 20:80 | −55 | 0.0029 | 0.0027 | 9.3 | 12.9 | Invention Example |
| 3 | 940 | 30 | 50 | 0.20 | 1000 | 10 | N2: H2 = 20:80 | −55 | 0.0035 | 0.0028 | 8.0 | 10.2 | Invention Example |
| 4 | 940 | 30 | 50 | 0.15 | 1000 | 10 | N2: H2 = 20:80 | −55 | 0.0037 | 0.0029 | 7.8 | 9.0 | Invention Example |
| 5 | 940 | 30 | 50 | 0.25 | 1000 | 10 | N2: H2 = 20:80 | −55 | 0.0061 | 0.0029 | 4.8 | 13.5 | Comparative Example |
| 6 | 950 | 30 | 45 | 0.25 | 1020 | 10 | N2 = 100 | −50 | 0.0082 | 0.0031 | 3.8 | 14.2 | Comparative Example |
| 7 | 950 | 30 | 45 | 0.25 | 1000 | 10 | H2 = 100 | −50 | 0.0024 | 0.0024 | 10.0 | 11.2 | Invention Example |
| 8 | 950 | 30 | 45 | 0.20 | 1025 | 10 | Ar = 100 | −50 | 0.0024 | 0.0024 | 10.0 | 9.9 | Invention Example |
| 9 | 950 | 30 | 45 | 0.25 | 1025 | 10 | H2 = 100 | −5 | 0.0071 | 0.0029 | 4.1 | 13.8 | Comparative Example |
| 10 | 950 | 30 | −10 | 0.25 | 1025 | 10 | H2 = 100 | −50 | 0.0068 | 0.0029 | 4.3 | 13.7 | Comparative Example |
| 11 | 950 | 30 | 50 | 0.25 | 1025 | 10 | H2: Ar = 20:80 | −60 | 0.0024 | 0.0024 | 10.0 | 11.1 | Invention Example |
| 12 | 980 | 30 | 50 | 0.27 | 1000 | 10 | H2: Ar = 20:80 | −50 | 0.0019 | 0.0019 | 10.0 | 12.5 | Invention Example |
| 13 | 960 | 30 | 50 | 0.25 | 1000 | 10 | H2: Ar = 20:80 | −50 | 0.0020 | 0.0020 | 10.0 | 11.5 | Invention Example |
| 14 | — | — | — | — | — | — | — | — | — | — | — | — | Comparative Example |
| 15 | — | — | — | — | — | — | — | — | — | — | — | — | Comparative Example |
| 16 | 890 | 30 | 50 | 0.25 | 1000 | 10 | H2 = 100 | −45 | 0.0027 | 0.0027 | 10.0 | 10.5 | Invention Example |
| 17 | 870 | 30 | 50 | 0.25 | 1000 | 20 | H2 = 100 | −45 | 0.0027 | 0.0027 | 10.0 | 9.7 | Invention Example |
| 18 | — | — | — | — | — | — | — | — | — | — | — | — | Comparative Example |
| 19 | 910 | 30 | 60 | 0.30 | 1000 | 10 | N2: H2 = 10:90 | −50 | 0.0026 | 0.0024 | 9.2 | 12.2 | Invention Example |
| 20 | 910 | 30 | 60 | 0.20 | 1000 | 10 | N2: H2 = 10:90 | −50 | 0.0026 | 0.0024 | 9.2 | 9.4 | Invention Example |
| 21 | — | — | — | — | — | — | — | — | — | — | — | — | Comparative Example |
| 22 | 960 | 30 | 60 | 0.25 | 1000 | 10 | N2: H2 = 20:80 | −55 | 0.0024 | 0.0021 | 8.8 | 11.2 | Invention Example |
| 23 | 940 | 30 | 60 | 0.25 | 1000 | 10 | N2: H2 = 20:80 | −55 | 0.0025 | 0.0022 | 8.8 | 11.0 | Invention Example |
| 24 | 970 | 30 | 40 | 0.27 | 1050 | 10 | N2: H2 = 10:90 | −58 | 0.0025 | 0.0022 | 8.8 | 11.7 | Invention Example |

*1: Left side of equation (1) = (t × N₂)/{(t/10) × N₁} ≥ 5.0

Note:
Nos. 14, 15 and 18 cause slab cracking and cannot be formed into a produce sheet. No. 21 causes sheet fracture and cannot be formed into product sheet.

45

TABLE 2-2

| | Hot-band annealing conditions | | | Final sheet | Finish annealing conditions | | | | N after finish annealing | | | | |
|---|---|---|---|---|---|---|---|---|---|---|---|---|---|
| Steel No. | temperature (°C.) | Time (sec) | Dew point (°C.) | thickness (mm) | Temperature (°C.) | Time (sec) | Atmosphere (vol %) | Dew point (°C.) | Entire 1/20 layer (mass %) | Left side sheet thickness (mass %) | of equation (1)*1 | Iron loss $W_{10/400}$ (W/kg) | Remarks |
| 25 | 950 | 30 | 30 | 0.25 | 1000 | 10 | N2: H2 = 10:90 | −60 | 0.0023 | 0.0021 | 9.1 | 10.9 | Invention Example |
| 26 | 950 | 30 | 30 | 0.25 | 1000 | 10 | N2: H2 = 10:90 | −60 | 0.0023 | 0.0021 | 9.1 | 10.9 | Invention Example |
| 27 | 950 | 30 | 30 | 0.25 | 1000 | 10 | N2: H2 = 10:90 | −60 | 0.0023 | 0.0021 | 9.1 | 10.9 | Invention Example |
| 28 | 950 | 30 | 50 | 0.25 | 1000 | 10 | N2: H2 = 20:80 | −50 | 0.0027 | 0.0026 | 9.6 | 14.1 | Comparative Example |
| 29 | 950 | 30 | 50 | 0.25 | 1000 | 10 | N2: H2 = 20:80 | −50 | 0.0031 | 0.0027 | 8.7 | 15.3 | Comparative Example |
| 30 | 950 | 30 | 50 | 0.25 | 1000 | 10 | N2: H2 = 20:80 | −50 | 0.0035 | 0.0027 | 7.7 | 14.9 | Comparative Example |
| 31 | 950 | 30 | 50 | 0.25 | 1000 | 10 | N2: H2 = 20:80 | −50 | 0.0036 | 0.0027 | 7.5 | 14.6 | Comparative Example |
| 32 | 950 | 30 | 50 | 0.25 | 1000 | 10 | N2: H2 = 20:80 | −50 | 0.0081 | 0.0027 | 3.3 | 16.2 | Comparative Example |
| 33 | 920 | 30 | 60 | 0.20 | 1020 | 10 | Ar = 100 | −54 | 0.0022 | 0.0022 | 10.0 | 9.3 | Invention Example |
| 34 | 920 | 30 | 60 | 0.25 | 1020 | 10 | H2: Ar = 20:80 | −54 | 0.0025 | 0.0022 | 8.8 | 10.5 | Invention Example |
| 35 | 920 | 30 | 60 | 0.30 | 1050 | 10 | N2: H2 = 20:80 | −54 | 0.0024 | 0.0022 | 9.2 | 11.9 | Invention Example |
| 36 | 900 | 30 | 60 | 0.15 | 1000 | 10 | N2: H2 = 20:80 | −59 | 0.0026 | 0.0022 | 8.5 | 8.8 | Invention Example |
| 37 | 900 | 30 | 60 | 0.20 | 1000 | 10 | Ar = 100 | −60 | 0.0023 | 0.0023 | 10.0 | 9.5 | Invention Example |

TABLE 2-2-continued

| | Hot-band annealing conditions | | | Final sheet | Finish annealing conditions | | | | N after finish annealing | | | | |
|---|---|---|---|---|---|---|---|---|---|---|---|---|---|
| Steel No. | temperature (° C.) | Time (sec) | Dew point (° C.) | thickness (mm) | Temperature (° C.) | Time (sec) | Atmosphere (vol %) | Dew point (° C.) | 1/20 layer (mass %) | Entire sheet thickness (mass %) | Left side of equation (1)[*1] | Iron loss $W_{10/400}$ (W/kg) | Remarks |
| 38 | 900 | 30 | 60 | 0.25 | 1000 | 10 | N2: H2 = 10:90 | −55 | 0.0024 | 0.0023 | 9.6 | 10.7 | Invention Example |
| 39 | 950 | 30 | 60 | 0.25 | 1025 | 10 | H2: Ar = 10:90 | −55 | 0.0031 | 0.0031 | 10.0 | 10.9 | Invention Example |
| 40 | 950 | 30 | 65 | 0.25 | 1025 | 10 | Ar = 100 | −55 | 0.0029 | 0.0024 | 8.3 | 10.4 | Invention Example |
| 41 | 950 | 30 | 65 | 0.25 | 1025 | 10 | H2: Ar = 20:80 | −50 | 0.0031 | 0.0024 | 7.7 | 10.3 | Invention Example |
| 42 | 950 | 30 | 65 | 0.25 | 1025 | 10 | H2: Ar = 20:80 | −50 | 0.0030 | 0.0024 | 8.0 | 10.4 | Invention Example |
| 43 | 950 | 30 | 65 | 0.25 | 1025 | 10 | H2: Ar = 20:80 | −50 | 0.0034 | 0.0025 | 7.4 | 10.3 | Invention Example |
| 44 | 950 | 30 | 65 | 0.25 | 1025 | 10 | H2: Ar = 20:80 | −50 | 0.0032 | 0.0025 | 7.8 | 10.2 | Invention Example |
| 45 | 950 | 30 | 65 | 0.25 | 1025 | 10 | Ar = 100 | −50 | 0.0033 | 0.0026 | 7.9 | 10.4 | Invention Example |
| 46 | 950 | 30 | 65 | 0.25 | 1025 | 10 | Ar = 100 | −50 | 0.0032 | 0.0023 | 7.2 | 10.4 | Invention Example |
| 47 | 950 | 30 | 65 | 0.25 | 1025 | 10 | H2 = 100 | −50 | 0.0032 | 0.0023 | 7.2 | 10.3 | Invention Example |
| 48 | 950 | 30 | 65 | 0.25 | 1025 | 10 | H2 = 100 | −50 | 0.0032 | 0.0023 | 7.2 | 10.4 | Invention Example |
| 49 | 950 | 30 | 65 | 0.25 | 1025 | 10 | H2: Ar = 20:80 | −50 | 0.0032 | 0.0023 | 7.2 | 10.5 | Invention Example |
| 50 | 950 | 30 | 65 | 0.25 | 1025 | 10 | H2: Ar = 20:80 | −50 | 0.0034 | 0.0025 | 7.4 | 10.9 | Invention Example |

[*1]: Left side of equation (1) = $(t \times N_2)/\{(t/10) \times N_1\} \geq 5.0$

The invention claimed is:

1. A non-oriented electrical steel sheet having a chemical composition comprising C: not more than 0.0050 mass %, Si: 3.6 to 6.5 mass %, Mn: 0.05 to 2.0 mass %, P: not more than 0.10 mass %, S: not more than 0.0050 mass %, Al: 0.7 to 2.0 mass %, N: not more than 0.0050 mass %, Zn: 0.0005 to 0.0050 mass %, Ti: not more than 0.0030 mass %, Nb: not more than 0.0030 mass %, O: not more than 0.0050 mass % and the remainder being Fe and inevitable impurities, characterized in that t, $N_1$ and $N_2$ satisfy the following equation (1):

$$(t \times N_2)/\{(t/10) \times N_1\} \geq 5.0 \quad (1),$$

where t (mm) represents a steel sheet thickness, $N_1$ (mass %) represents a concentration of nitrogen present as AlN in a layer from a one-side surface of the steel sheet to a depth of 1/20 of the sheet thickness, and $N_2$ (mass %) represents a nitrogen concentration present as AlN in an entire sheet thickness.

2. The non-oriented electrical steel sheet according to claim 1, which contains one or two selected from Sn: 0.005 to 0.20 mass % and Sb: 0.005 to 0.20 mass %, in addition to the above chemical composition.

3. The non-oriented electrical steel sheet according to claim 1, which contains at least one group selected from the following group A and group B, in addition to the above chemical composition:

Group A: one or more selected from Ca, Mg and REM by 0.0005 to 0.020 mass % in total;

Group B: one or more selected from Cu, Ni and Cr by 0.01 to 1.0 mass % in total.

4. The non-oriented electrical steel sheet according to claim 1, wherein
a sheet thickness is not more than 0.30 mm.

5. The non-oriented electrical steel sheet according to claim 2, wherein the sheet thickness is not more than 0.30 mm.

6. The non-oriented electrical steel sheet according to claim 2, which contains at least one group selected from the following group A and group B, in addition to the above chemical composition:

Group A: one or more selected from Ca, Mg and REM by 0.0005 to 0.020 mass % in total;

Group B: one or more selected from Cu, Ni and Cr by 0.01 to 1.0 mass % in total.

7. The non-oriented electrical steel sheet according to claim 6, wherein the sheet thickness is not more than 0.30 mm.

8. The non-oriented electrical steel sheet according to claim 3, wherein the sheet thickness is not more than 0.30 mm.

* * * * *